(12) United States Patent
Glasgow et al.

(10) Patent No.: US 7,890,888 B2
(45) Date of Patent: Feb. 15, 2011

(54) SYSTEMS AND METHODS FOR CONFIGURING A USER INTERFACE HAVING A MENU

(75) Inventors: Dane A. Glasgow, Los Gatos, CA (US); Eddie L. Mays, Renton, WA (US); Neel I. Murarka, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 614 days.

(21) Appl. No.: 10/971,540

(22) Filed: Oct. 22, 2004

(65) Prior Publication Data

US 2006/0090142 A1  Apr. 27, 2006

(51) Int. Cl.
*G06F 3/048* (2006.01)

(52) U.S. Cl. .................. 715/811; 715/780; 715/822; 715/825

(58) Field of Classification Search ............... 715/810, 715/780, 811, 822, 825, 815; 707/3, 4
See application file for complete search history.

(56) References Cited

U.S. PATENT DOCUMENTS

| 5,041,967 | A  | * | 8/1991  | Ephrath et al. ............. 715/825 |
| 5,164,133 | A  |   | 11/1992 | Ishida et al. |
| 6,091,415 | A  | * | 7/2000  | Chang et al. ............... 715/809 |
| 6,112,215 | A  | * | 8/2000  | Kaply ........................ 715/507 |
| 6,118,427 | A  | * | 9/2000  | Buxton et al. ............... 345/629 |
| 6,493,006 | B1 | * | 12/2002 | Gourdol et al. ............. 715/825 |
| 6,564,213 | B1 | * | 5/2003  | Ortega et al. .................... 707/5 |
| 6,847,387 | B2 | * | 1/2005  | Roth ........................... 715/811 |
| 7,003,730 | B2 | * | 2/2006  | Dettinger et al. ............ 715/764 |
| 7,039,635 | B1 | * | 5/2006  | Morgan et al. ................. 707/4 |
| 7,080,325 | B2 | * | 7/2006  | Treibach-Heck et al. .... 715/780 |
| 7,158,123 | B2 |   | 1/2007  | Myers et al. |
| 7,185,271 | B2 | * | 2/2007  | Lee et al. .................... 715/226 |
| 7,194,695 | B1 | * | 3/2007  | Racine et al. ............... 715/780 |
| 7,216,301 | B2 | * | 5/2007  | Moehrle ..................... 715/811 |
| 7,512,900 | B2 | * | 3/2009  | Lynch et al. ................ 715/825 |
| 2002/0095658 | A1 | * | 7/2002 | Shulman et al. ............. 717/111 |
| 2003/0179201 | A1 | * | 9/2003 | Thacker ...................... 345/441 |

* cited by examiner

*Primary Examiner*—Weilun Lo
*Assistant Examiner*—Phenuel S Salomon
(74) *Attorney, Agent, or Firm*—Lee & Hayes, PLLC (57) ABSTRACT

Systems and Methods for configuration of a menu for display via a user interface are described. In an implementation, a method includes monitoring text input by a user via a user interface. A menu is configured, based on the monitoring, to display actions to be performed using the text. In another implementation, a method includes examining a plurality of inputs received from a user. The inputs specify text and selection of an action from a menu to be performed on the text. An alternative technique is displayed that may be utilized to enter the text and perform the action.

32 Claims, 6 Drawing Sheets

SYSTEMS AND METHODS FOR CONFIGURING A USER INTERFACE HAVING A MENU

TECHNICAL FIELD

The present invention generally relates to the field of user interfaces and more particularly relates to systems and methods for configuring a user interface having a menu.

BACKGROUND

A client may be configured in a variety of ways to provide functionality to a user. For example, the client may be configured as a wireless phone to enable the user to communicate using voice and/or text messaging, as a computer that is communicatively coupled to the Internet to access one or more web sites, and so on. To enable the user to interact with the client, the client may include a user interface. The user interface, which is also known as a man/machine interface (MMI), describes the aspects of the client that can be perceived by the user, and the commands and mechanisms used by the user to control its operation and input data.

The user interface may be configured in a variety of ways to provide this interaction. In the past, for instance, the user interface was provided as a collection of knobs and dials for manual manipulation by the user and gauges for viewing by the user. As technology improved, textual and graphical user interfaces evolved to provide a user with improved techniques for entering and viewing data, such as through use of cursor control devices and color display devices. Even though user interfaces have continued to provide improve techniques for interacting with clients, however, functionality available to a user via the user interface may go unnoticed.

The client, for example, may be configured to perform a wide range of actions, such as to perform calculations, web searches, define terms, and so on. The number of actions that may be performed by the client may become so great, however, that the user, when confronted with the variety of options, may choose to ignore some or all of the available actions. For instance, the user may choose to utilize a default option rather than take the time to learn about which of the available actions may be desirable. Thus, actions which have the potential of improving the user's experience with the client may be underutilized.

Therefore, there is a continuing need for techniques that may be employed to configure a user interface for efficient interaction by a user.

SUMMARY

Configuration of a user interface having a menu is described. In an implementation, a user interface is provided that includes a text input box and a menu. The menu is configured to expose actions that may be performed based on text that is entered in the text input box. The configuration of the menu may be performed in a variety of ways. For example, the menu may include actions that were selected from a plurality of actions based on the text that is entered by a user. In another example, the actions are ordered in the menu based on the entered text. In a further example, the display of one or more of the actions is altered such that it is different from the display of other actions represented in the menu, such as through highlighting, bolding, underlining, flashing, display as a reverse image (e.g., a negative image), and so on. In an implementation, the configuring of the menu may be performed dynamically as the user enters text such that the user is provided with an updated display of the menu that addresses the text as currently entered via the user interface.

A variety of other techniques may also be employed to configure a user interface for efficient interaction by a user. For example, a user interface may be configured to teach the user about available actions and techniques that may be utilized to implement the actions. For instance, the user may provide a plurality of inputs by using a keyboard and cursor control device to enter text and select an action to be performed using the text. The user interface, upon receipt of the inputs, may display an alternative technique to enter the text and perform the action, such as a text input technique that does not require use of the cursor control device. In another example, the user interface may include a text input box that scales depending amount of display space utilized to display text. For instance, the text input box may be configured to expand as the user enters text and contract as the user deletes text entered in the text input box.

BRIEF DESCRIPTION OF THE DRAWINGS

The same reference numbers are utilized in instances in the discussion to reference like structures and components.

DETAILED DESCRIPTION

Configuration of a menu for display via a user interface is described. The menu may be configured in a variety of ways. For example, the menu may be configured based on text entered via the user interface, such as to select the actions from a plurality of available actions, to order the actions in the menu, to determine how each of the actions in the menu is to be displayed, and so on. The configuring of the menu may be performed dynamically as the user enters text such that the menu is updated to address any currently entered text. Further discussion of such configuring may be found in relation to FIG. 3.

The user interface may also be configured to provide a wide variety of other functionality. For example, the user interface may be configured to teach alternative ways of initiating actions available from the user interface, further discussion of which may be found in relation to FIG. 4. In another example, the user interface may be configured to automatically rescale a text input box based on an amount of display space utilized to display text entered in the user interface, further discussion of which may be found in relation to FIG. 5. In the following discussion, an exemplary environment which is operable to employ the user interface is described first and then followed by a discussion of exemplary procedures which may be implemented in the exemplary environment.

Exemplary Environment

Figure 1:
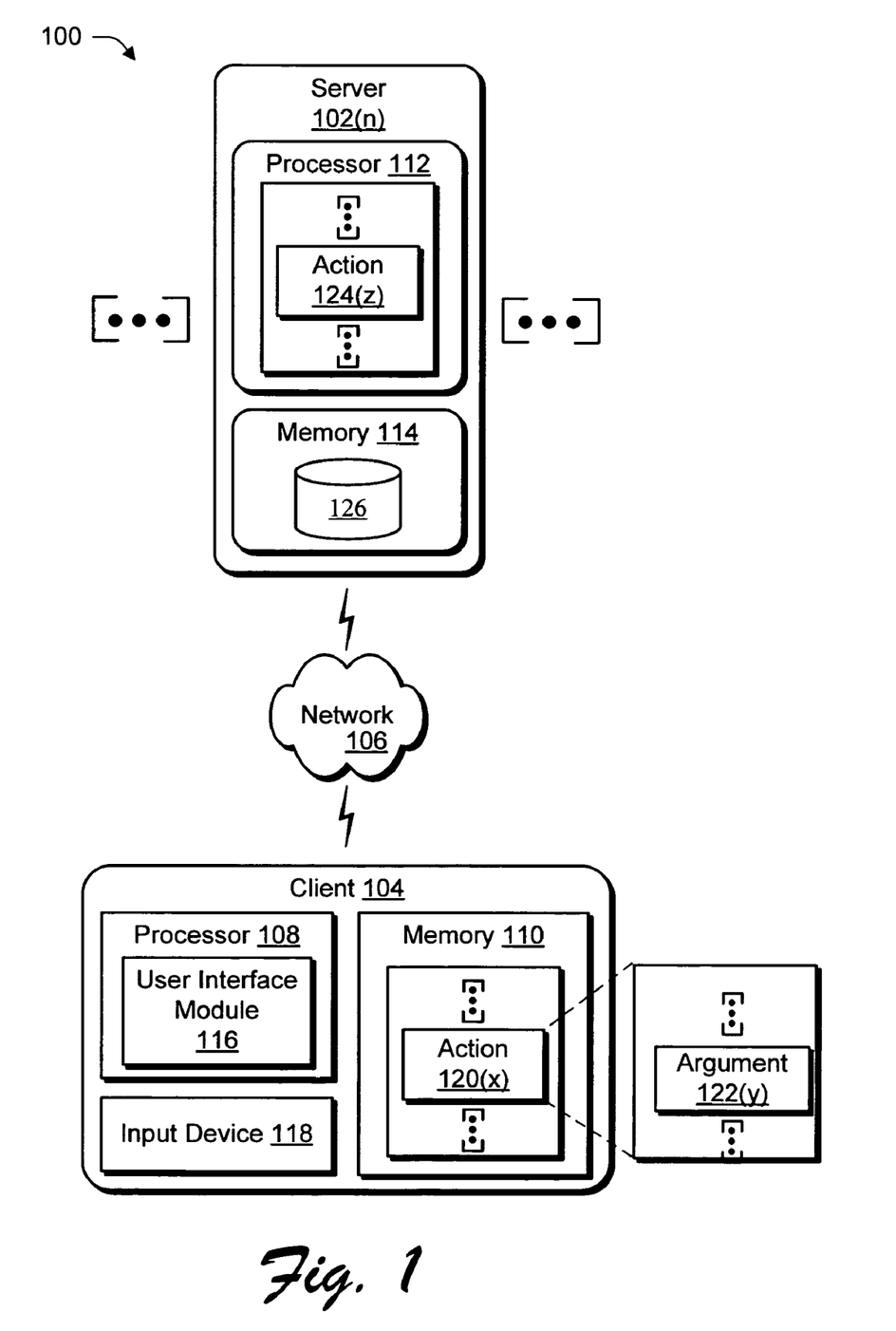
FIG. 1 is an illustration of an environment in an exemplary implementation that includes a client communicatively coupled to a plurality of servers over a network, in which the client and the plurality of servers are configured to perform a variety of actions.

FIG. 1 is an illustration of an environment 100 in an exemplary implementation in which a plurality of servers 102(n), where "n" can be any integer from one to "N", are communicatively coupled to a client 104 over a network 106. The client 104 may be configured in a variety of ways. For example, the client 104 may be configured as a computer that is capable of communicating over a network 106, such as a desktop computer, a mobile station, an entertainment appliance, a game console, a set-top box communicatively coupled to a display device, a wireless phone, and so forth. The client 104 may range from a full resource device with substantial memory and processor resources (e.g., personal computers, television recorders equipped with hard disk) to low-resource devices with limited memory and/or processing resources (e.g., traditional set-top boxes). In the following discussion, the client 104 may also relate to a person and/or entity that operate the client. In other words, client 104 may describe a logical client that includes a user and/or a machine. The network 106 is illustrated as the Internet, and may include a variety and combinations of other networks, such as a wide area network (WAN), an intranet, a wired or wireless telephone network, a satellite network, a cable network, a digital subscriber line (DSL) network, a broadcast network with a backchannel to provide two-way communication, and so forth.

The client 104 includes a processor 108 and memory 110. Likewise, the server 102(n) is also illustrated as including a processor 112 and memory 114. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 110, 114 is shown, respectively, for the client 104 and servers 102(n), a wide variety of types and combinations of memory may be employed, such as random access memory (RAM), hard disk memory, removable medium memory, and so forth.

The client 104 includes a user interface module 116 which is illustrated as being executed on the processor 108 and is storable in memory 110. The user interface module 116 is executable to process aspects of the client 104 that can be perceived (e.g., viewed and heard) by the user, and the commands and mechanisms used by the user to control its operation and input data. For example, the user interface module 116 may accept inputs from an input device 118 that is manipulated by a user, such as a keyboard, a cursor control device, a microphone, and so on. The inputs may be utilized to select one or more of a plurality of actions 120(x), where "x" can be any integer from one to "X", which may be performed by the client 104. The actions 120(x) are illustrated as software that is stored in the memory 110 and are executable on the processor 108 to provide corresponding functionality.

One or more of the actions 120(x), for example, may support one or more arguments 122(y), where "y" can be any integer from one to "Y". For instance, action 120(x) may be executable to provide definitions of words. To find a desired definition, a user may specify the word, which is supplied as an argument 122(y) for the action 120(x). For example, the action 120(x) may be configured as "query <word>" which accepts a user-supplied argument 122(y) "football" to locate a definition for the desired word. Thus, the plurality of actions 120(x) may be configured to receive text as an input and perform an action based on that text. Although a "definition" action has been described, the plurality of actions 120(x) may be configured to provide a wide range of functionality to the user, such as translation, mathematical calculations, searching, and so on.

The user interface module 116 may also provide the user with access to a plurality of actions 124(z), where "z" can be any integer from one to "Z", which is available remotely over the network 106. The plurality of actions 124(z) is illustrated as being executed on the processor 122 and is storable in memory 114 of the server 102(n). The plurality of actions 124(z) may be the same as or different from the plurality of actions 120(x) that are available locally on the client 104. For example, the plurality of actions 124(z) on the server 102(n) may also be configured to provide definitions, mathematical calculations, and so on. The plurality of actions 124(z) may also provide additional actions that are not available locally on the client 104, such as Internet searching, shopping (e.g., e-commerce), news sources, and so on. For instance, action 124(z) may be executed to locate a news article from a database 126 that is accessible on the server 102(n) and transfer the located news article over the network 106 for output on the client 104 via the user interface module 116.

The pluralities of actions 120(x), 124(z) may provide application logic that is programmatically available. For example, action 120(x) may be called by the user interface module 116, which may then receive data in a format that may be accessed and processed by the user interface module 116 to be rendered for viewing by the user. By providing application logic that is programmatically available, actions 120(x), 124(z) may be accessed in a variety of ways. Action 120(x), for instance, may be accessed by the user interface module 116 implemented internally within the client 104. Action 124(z) may be accessed by the user interface module 116 over the network 106, and therefore across the device boundary of the client 104. Thus, the user interface module 116 may provide access to a wide variety of actions 120(x), 124(z) that are distributed throughout the environment 100. The user interface module 116, when executed, may configure a user interface that represents the actions 120(x), 124(z) in a variety of ways to provide desired functionality, such as based on text entered by the user, to teach alternative techniques for initiating the actions, and so on, further discussion of which may be found in relation to FIGS. 3-6.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory hardware storage devices, referred to herein as "computer readable media," such as the memories 110, 114. The features of the configuration strategies described below are platformindependent, meaning that the strategies may be implemented on a variety of commercial computing platforms having a variety of processors.

Figure 2:
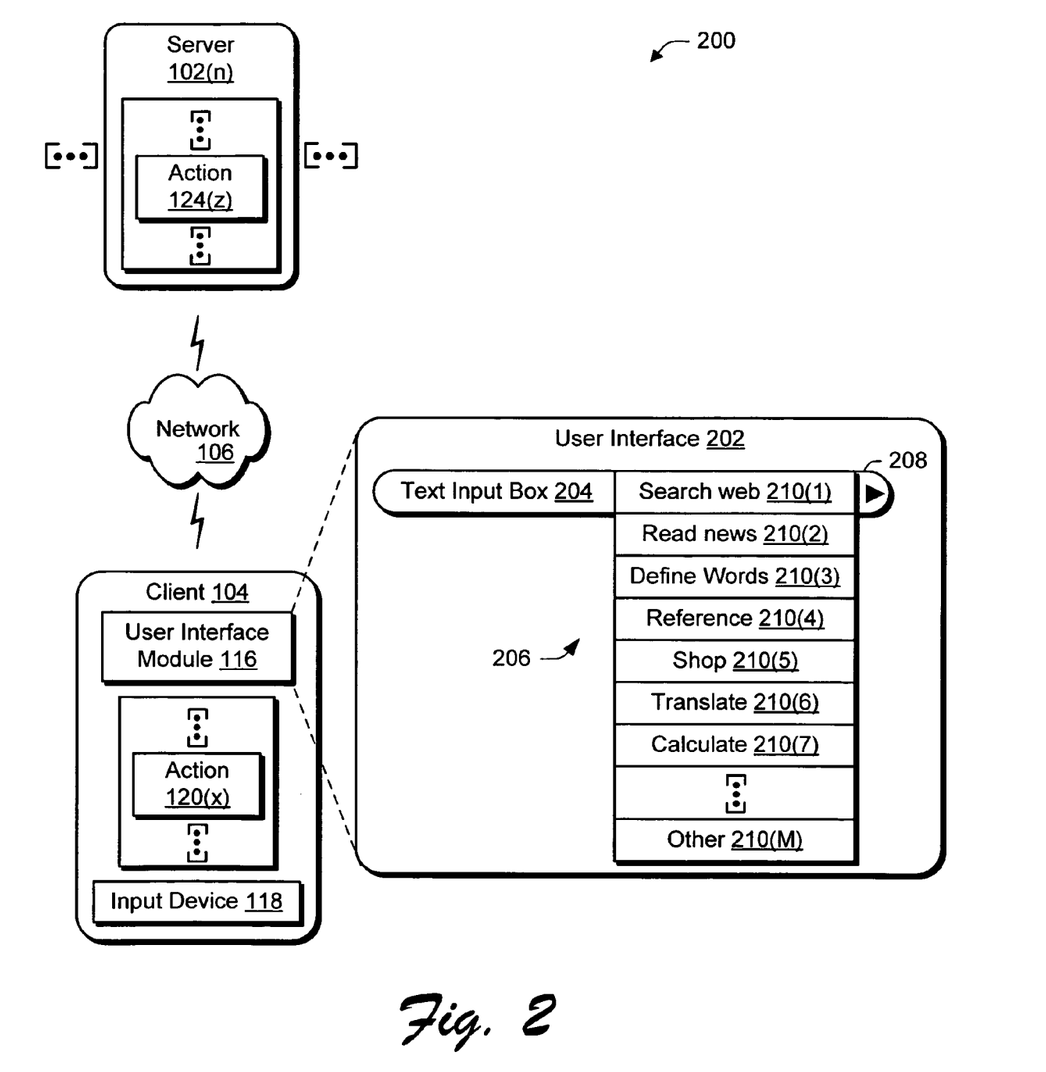
FIG. 2 is an illustration of a system showing a user interface, generated through execution of a user interface module on the client, which represents the plurality of actions of FIG. 1.

FIG. 2 is an illustration of a system 200 showing a user interface 202 generated through execution of the user interface module 116 on the client 104. The user interface 202 is illustrated as a window having a text input box 204, a menu 206, and a button 208. The menu 206 includes representations of the pluralities of actions 120(x), 124(z) that are available locally on the client 104 and remotely on the plurality of servers 102(n), respectively. In the illustrated example, the menu 206 includes representations of actions that are configured to "search web" 210(1), "read news" 210(2), "define words" 210(3), "reference" 210(4), "shop" 210(5), "translate" 210(6), "calculate" 210(7), . . . , and "other" 210(M) actions. Each of the representations is selectable by a user (e.g., via the input device 118) for causing performance of the represented action. In the following discussion, reference to the representations may be made to the representation itself (e.g., representation 210(1)) and/or the action that is represented (e.g., search web 210(1)).

The user, for example, may utilize the input device 118 to enter text in the text input box 204. The user interface module 116 is executed to configure the user interface 202 based on the text entered in the text input box 204. For example, the user interface module 116 may order the representations 210(1)-210(M) in the menu based on likelihood that the user will initiate the represented action. The user interface module 116 may also configure the menu 206 to select which of the pluralities of actions 120(x), 124(z) are to be represented in the menu based on the likelihood that the user will wish to initiate the represented action. Further, the user interface module 116 may display the representations such that the user's attention is drawn to particular actions represented in the menu 206, such as by bolding, italicizing, highlighting, and/or underlining one or more of the representations. Upon selection of one or more of the representations 210(1)-210(M), the user may select the button 208 to cause actions referenced by the selected representations to be performed. Further discussion of configuring the menu based on text entered in the text input box 204 may be found in relation to FIGS. 3 and 4.

Exemplary Procedures

The following discussion describes techniques of configuring a menu that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In the following discussion, reference is also made to the exemplary environment 100 and system 200 of FIGS. 1 and 2, respectively, such that reference numbers beginning with "1" or "2" may also be found, respectively, in FIGS. 1 and 2, as well as in relation to the corresponding flow diagrams. It should be noted that the following exemplary procedures may be implemented in a wide variety of other environments without departing from the spirit and scope thereof.

Figure 3:
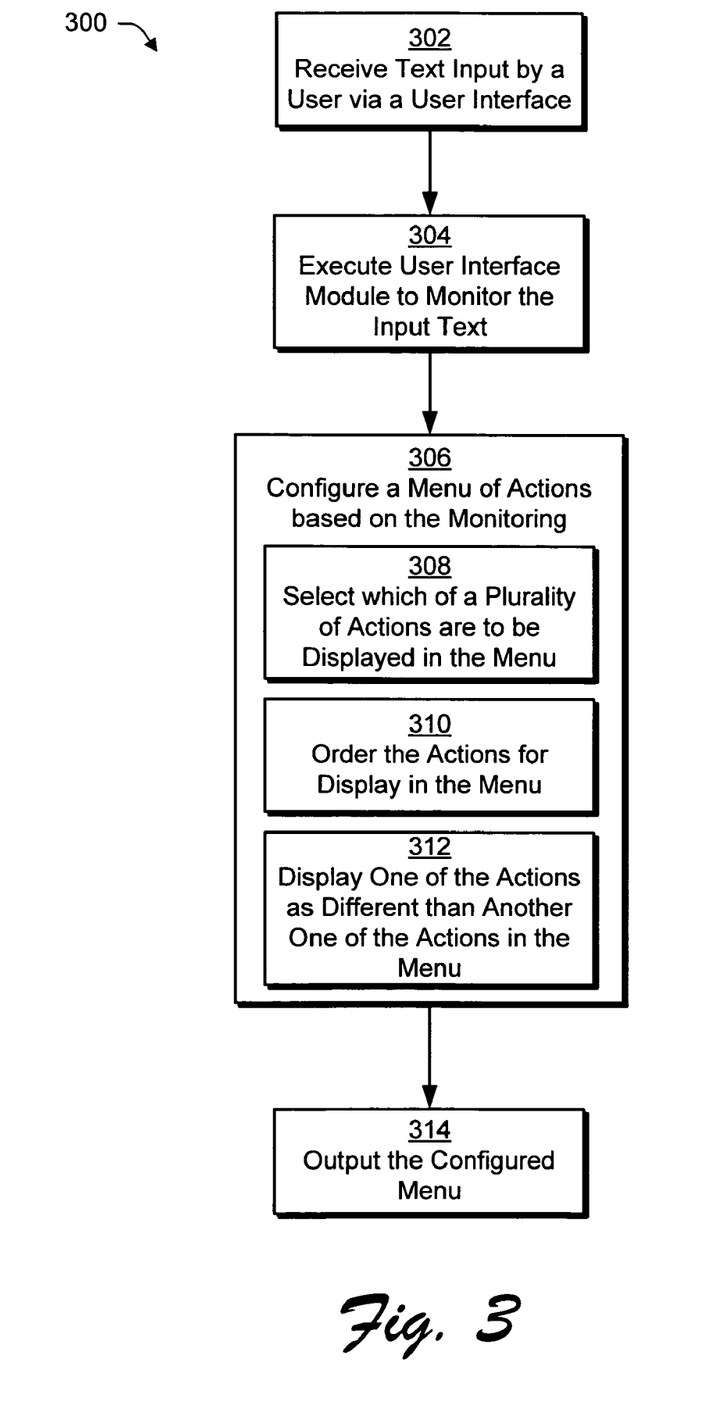
FIG. 3 is a flow diagram depicting a procedure in an exemplary implementation in which a user interface has a menu which is configured based on text entered in a text input box of the user interface.

FIG. 3 is a flow diagram depicting a procedure 300 in an exemplary implementation in which a user interface has a menu which is configured based on text entered in a text input box of the user interface. The client 104 receives text input by a user via the user interface 202 (block 302). For example, the user may utilize the input device 118 (e.g., a keyboard, microphone, and so on) to enter text in the text input box 204 the user interface 202.

The user interface module 116, when executed, monitors the input text (block 304) and configures the menu 206 of actions based on the monitoring (block 306). The menu 206, for example, may include a plurality of representations 210(1)-210(M) of actions 120(x), 124(z) that are executable, respectively, locally on the client 104 and/or remotely on the server 102(n). The representations 210(1)-210(M) may be configured in the menu 206 based on a wide variety of considerations to add additional functionality to the user.

The user interface module 116, for example, may select which of a plurality of actions 120(x), 124(z) are to be displayed in the menu 206 (block 308). For instance, the text input by the user may indicate that a particular one of the actions may be selected by a user, such as by entering text (e.g., "danke gut") in a foreign language (e.g., German) that may then be translated (e.g., "fine, thank you") using the "translate" 210(6) action. The user interface module 116 may select these likely actions in a wide variety of ways, such as through a database indicating combinations of text and corresponding actions, heuristics that address previous selection of actions and corresponding text made at the client 104 (e.g., by the particular user), and so on.

In another example, the user interface module 116 orders the actions for display in the menu 206 (block 310). Continuing with the previous example, the user interface module 116 may make a probabilistic determination of the likelihood that the user will select the action and order the actions in the menu based on the determination. For instance, the entry of "danke" may indicate that the user wishes to use the "translate" 210(6) action. The word may also indicate that the user may wish to find a definition using a "define words" 210(3) action. However, based on heuristics, the likelihood that the user wishes to translate the word may be greater than the likelihood that the user wishes to define the word. Therefore, the user interface module 116, when executed, orders the actions such that the "translate" 210(6) action is displayed before the "define words" 210(3) action in the menu 206, such as through display at the "top" of the menu 206.

In a further example, the user interface module 116, based on the monitoring, displays one of the actions in a manner which is different than how another one of the actions is displayed in the menu 206 (block 312). For example, in additional to ordering of the actions (block 310), the user interface module 116 may configure one of the actions in the menu to be more noticeable than another one of the actions in the menu 206, such as through bolding, underlining, italicizing, highlighting, color change, translucence, motion (e.g., flashing), and so on. This difference between how the actions are represented in the menu 206 may be utilized to "steer" (i.e., direct) the user's attention to the actions that are most likely to be relevant to the user. Thus, the selecting (block 308), ordering (block 310), and displaying (block 312) may be utilized to suggest relevant actions to the user which may be performed on text entered by the user in the text input box 204 based on the entered text itself, and may also utilize additional considerations, such as heuristics. The configured menu may then be output for viewing by the user (block 314). The configuration of the menu 208 may also be performed dynamically as text is entered by the user, further discussion of which may be found in relation to the following figure.

Figure 4:
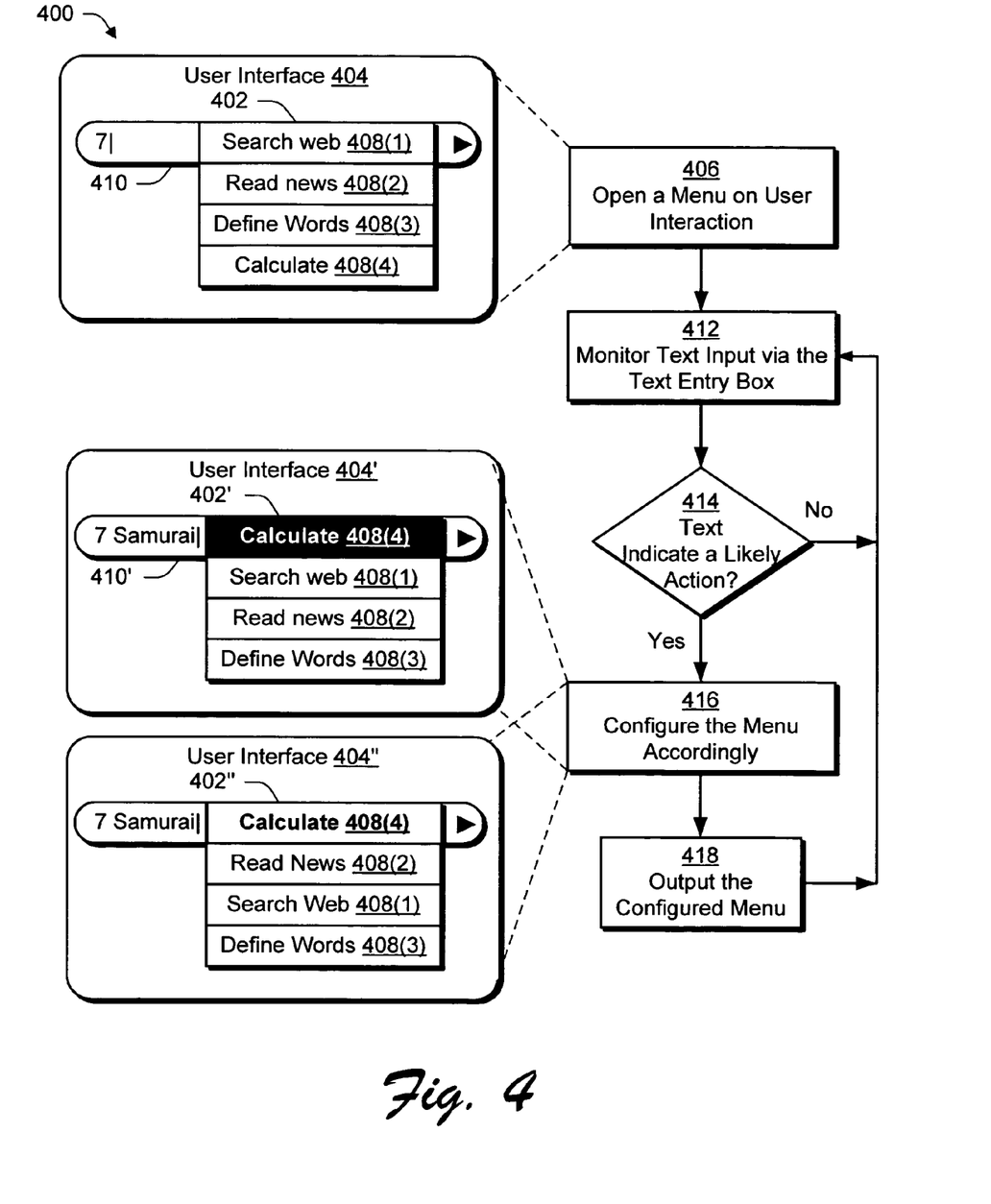
FIG. 4 is a flow diagram depicting a procedure in an exemplary implementation in which a user interface includes a menu that is dynamically configured while text is being received from a user.

FIG. 4 is a flow diagram depicting a procedure 400 in an exemplary implementation in which a user interface includes a menu which is dynamically configured while text is being received from a user. A menu 402 is output in a user interface 404 in response to user interaction (block 402). For example, the menu 402 may be configured as a "drop-down" menu that is displayed whenever the user positions a cursor over a "go" button 406, which is illustrated as an arrow in FIG. 4. The menu 402 is similar to the menu 206 of FIG. 2 in that the menu 402 includes representations of a plurality of actions, which are illustrated as "search web" 408(1), "read news" 408(2), "define words" 408(3), and "calculate" 408(4). The user interface 404 is also illustrated as including a text input box 410, in which, the user has entered the text "7" as illustrated in the user interface 404.

Text input in the text input box 410 is monitored (block 412) and a determination is made as to whether the text indicates a likely action (decision block 414). For example, the user interface module 116 may be executed to compare text entered in the text input box 410 with text in a database which indicates which of the pluralities of actions 120(x), 124(z) the user may desire to perform. As illustrated, for instance, the user may enter the text "7" in the text input box of the user interface 404. The user interface module 116, upon receipt of the text "7", may determine that the user is most likely to perform a calculation, since the text is a number. Therefore, because the text indicates a likely action (decision block 406), the menu 402 may be reconfigured accordingly to form menu 402' as shown in the user interface 404'.

As illustrated, menu 402' includes the plurality of representations 408(1)-408(4) which are reordered such that the representation of the action "calculate" 408(4) is displayed at the "top" of the menu 402'. Additionally, the representation "calculate" 408(4) is also configured to be displayed differently that the other representations 408(1)-408(3), which in the illustrated instance includes bolding, underlining, and display as a negative (i.e., reverse) image. Once so configured, the menu is output (block 418) for viewing by the user.

The configuring of the menu 402' may also continue as additional text is received in the text input box 410'. For example, as the user interface module 116 monitors the text and configures the user interface 404 (to form user interface 404') based on the monitoring (blocks 412-416), the user may continue to add additional text in the text input box 410', which is illustrated as "7 samurai". The user interface module 116 may monitor this additional text (e.g., "samurai") and determine if that text, in conjunction with and/or separate from the previous text (e.g., e.g., "7") indicates a likely action (decision block 414). If so, the user interface module 116 reconfigures the menu 402' of the user interface 404' to form menu 402" as shown in user interface 404".

The menu 402", as previously mentioned, may be configured in a variety of ways. For instance, the calculate 408(4) representation of menu 402" is still listed first in the menu 402", but has the "negative" display characteristic removed to indicate the reduced likelihood that the user wishes to perform a calculation. However, because the user entered the text "7" as a numeric character instead of alphabetically as "seven", the user interface module 116 may still determine that there is a likelihood that the user will perform a calculation. Thus, the representations may be displayed to indicate the relative likelihood of selection by a user.

The menu 402" of user interface 404", as illustrated, includes representations of actions that are reordered from the menu 402' of the previous user interface 404' to indicate relative likelihoods as previously described. For instance, the combination of the text "samurai" with the text "7" may indicate an increased likelihood that the user wishes to learn more about a recent release of the movie on DVD. Therefore, the user interface module 116 may order the "read news" 408(2) action above the other actions (e.g., "search web" 408(1) and "define words" 408(2)) yet below the "calculate" 408(4) action due to the weight given to the numeric entry of the text "7".

The procedure 400 may be repeated as the user continues to enter text, thereby providing a dynamic update of the menu 402", which may help to teach the user of the effect of text entry and the configuration of the menu 402. For example, as previously described, the user interface module 116 gave greater weight to the text "7" as indicating performance of a calculation, which was reflected in the ordering of the representations 408(1)-408(4) in the menu 402. Thus, the user is provided with generally simultaneous feedback regarding the effects of text entered into the text input box 410 and may therefore "teach" the user as to how this text is processed by the user interface module 116. The user interface module 116 may also "teach" the user in a wide variety of other ways, a further example of which is discussed in relation to the following figure.

Figure 5:
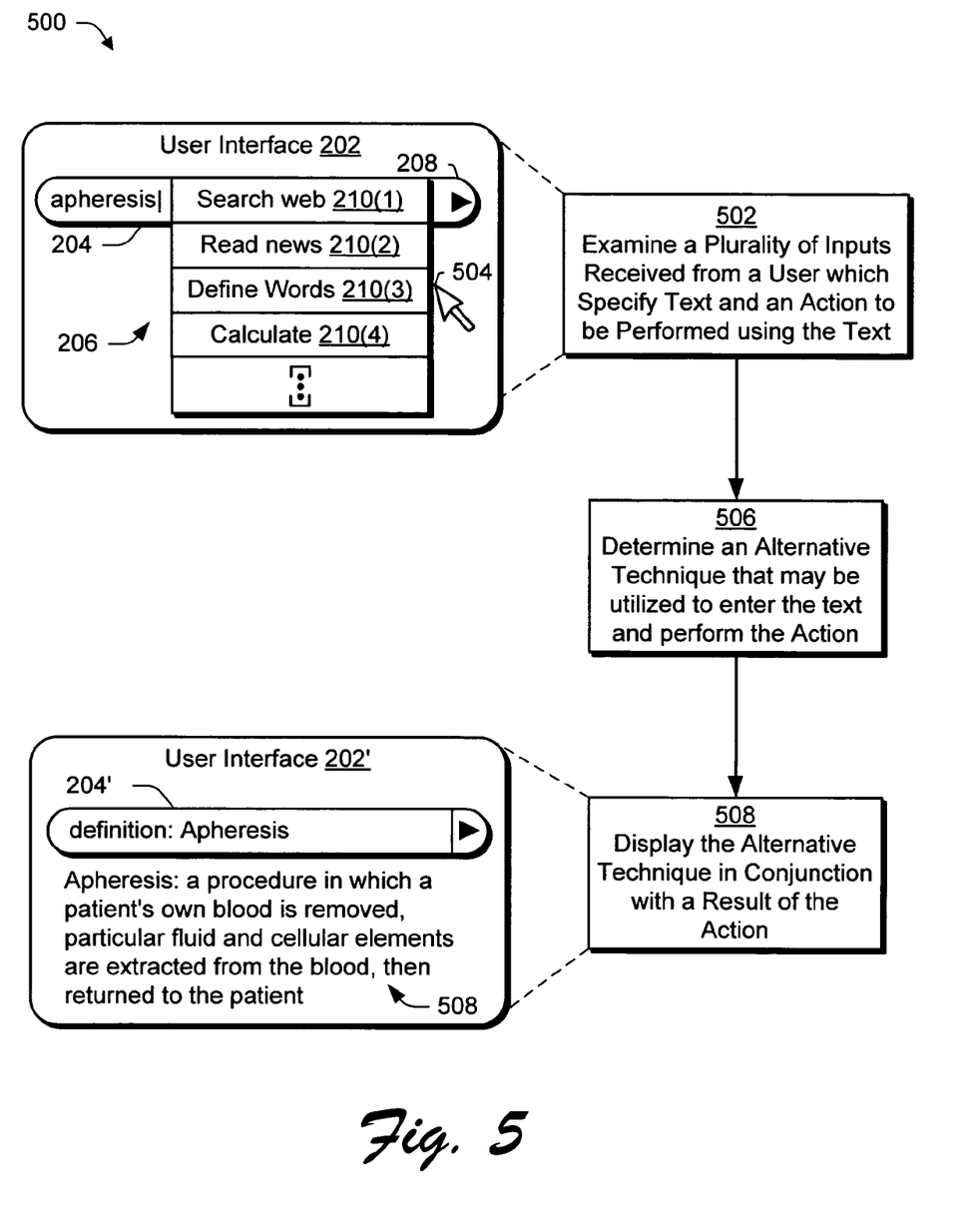
FIG. 5 is a flow diagram depicting a procedure in an exemplary implementation in which an alternative technique is displayed which may be utilized to enter text and perform an action that is requested by a user.

FIG. 5 is a flow diagram depicting a procedure 500 in an exemplary implementation in which an alternative technique is displayed which may be utilized to enter text and perform an action that is requested by a user. The user interface module 116, when executed, examines a plurality of inputs received from a user which specifies text and an action to be performed using the text (block 502). For example, the user may utilize a keyboard to enter the illustrated text "apheresis" in the text input box 204 of the user interface 202. The user, by manipulating a cursor 504 using a cursor control device, may then select the representation 210(3) of the action "define words" from the menu 206 and initiate the action by "pushing" the "go" button 208. The user interface module 116 receives and processes these inputs such that the user may interact with the user interface 202.

The user interface module 116 then determines an alternative technique that may be utilized to enter the text and perform the action (block 506) and displays the alternative technique in conjunction with a result of the action (block 508). For example, the examined inputs (block 502) which were utilized to find a definition of the word "apheresis" were input using a plurality of input devices (e.g., a keyboard and a cursor control device). The user interface module 116, when executed, may find an alternative technique for entering the text and initiates the action, which is displayed in the text input box 204' in the user interface 202' as "definition: apheresis". The alternative technique in this instance is configured to cause the user interface module 116 to perform the action "define words" associated with the representation 210 (3) without requiring the user to select the representation 210(3) from the menu 206. Thus, the user may utilize fewer input devices to enter the text and perform the action, thereby improving efficiency of the user's interaction with the user interface 202. In the illustrated implementation, the alternative technique (e.g., "definition: apheresis") is displayed in conjunction with a result 508 of the performed of the action (e.g., define words). Therefore, the user is "taught" about the alternative technique which may be utilized without delaying the performance of the action.

In another implementation, the alternative technique is displayed after the action is selected but before the action is initiated. For example, continuing with the previous example, the user entered the text "apheresis" in the text input box 204 and selected the representation 210(3) of the action "define words". Upon selection of the action, the user interface module 116 may reconfigure the user interface 202 such that the text "apheresis" is replaced with the display of the alternative technique "definition: apheresis" even before the user initiates the action with the "go" button 208. Thus, the user interface 202 may be dynamically reconfigured during user interaction to "teach" the user about alternative techniques.

Figure 6:
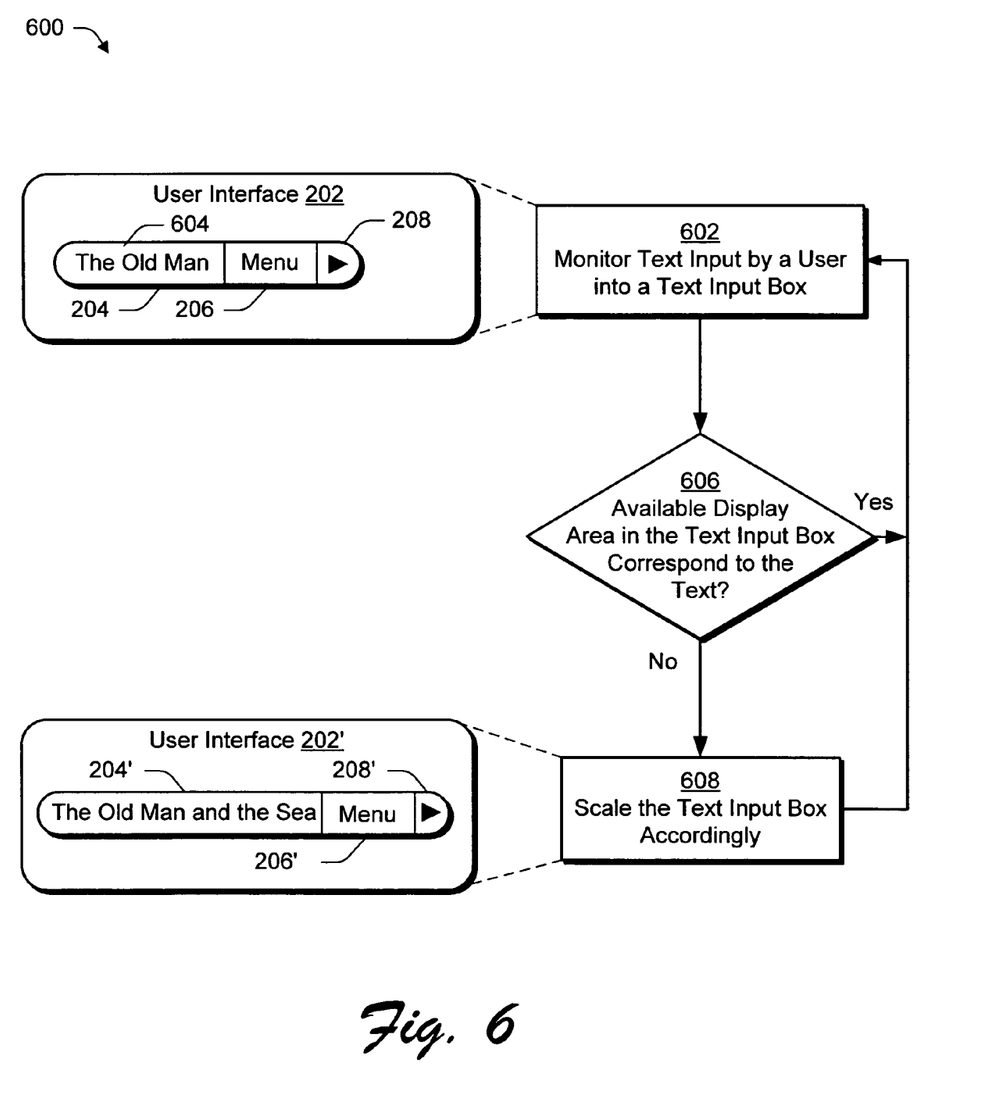
FIG. 6 is a flow diagram depicting a procedure in an exemplary implementation in which a text input box is scaled according to an amount of display space utilized to display text entered in the text input box by a user.

FIG. 6 is a flow diagram depicting a procedure 600 in an exemplary implementation in which a text input box is scaled according to an amount of display space utilized to display text entered in the text input box by a user. The user interface module 116 monitors text input by a user into the text input box 204 (block 602). As before, the user interface 202 also includes a menu 206 of action representations and a "go" button 208 to cause performance of a represented action. The user interface 202 is illustrated in FIG. 6 as including the text "The Old Man" 604 which is entered in the text input box 204.

The user interface module is executed during the user's interaction with the text input box 204 to determine whether the available display area in the text input box 204 corresponds to amount of display area utilized (e.g., consumed) by the text 604 (decision block 606). For example, as text is entered by the user into the text input box 204, the user interface module 116 may determine if there is enough available space to enter the text. If so (decision block 606), the user interface module may continue monitoring the text input (block 602).

If not (decision block 606), the user interface module scales the text input box 204 accordingly (block 608) to form text input box 204' for display in a reconfigured user interface 202'. For example, as illustrated in FIG. 6 the text input box 204 may be expanded to form text input box 204' so that the text "The Old Man and the Sea" may be displayed in the user interface 202' without scrolling. The procedure 600 may then continue monitoring text input by the user (block 602) so that the text input box 204 may continually address the amount of text entered by the user.

Although scaling through expansion of the text input box 204 was shown, the amount of display space utilized by the text input box may also be decreased to address text deletion by the user. For example, the user may enter the text "The Old Man and the Sea" as shown in the text input box 204' and then delete the text "and the sea" to result in the text "The Old Man" as shown in the user interface 202. Accordingly, the user interface module 116 may decrease the length of the text input box 204' to form text input box 204. Additionally, although scaling of length of a text input box 204 was shown in FIG. 6, a text input box may be scaled in a variety of other directions, such as vertically, both vertically and horizontally, and so on.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
monitoring text input by a user via a user interface;
determining content of the inputted text, the content being a substantive meaning of the text;
configuring a menu to display functional actions based on the content of the text, the functional actions to be performed using the text,
wherein the configuring includes selecting which of a plurality of functional actions is to be included in the menu based on the content of the text and determining an order of display of the functional actions within the menu based on the content of the text, heuristic rules, and a probabilistic determination of a likelihood that the user will select the functional actions included in the menu;
receiving a selection by the user of a functional action from the menu;
initiating the selected functional action, including performing the selected functional action on the inputted text;
determining an alternative technique that may be utilized by the user to perform a combination of inputting the text and initiating the selected functional action; and
after performing the selected functional action, displaying to the user the alternative technique that may be utilized to input the text and initiate the selected functional action, wherein the displaying comprises automatically replacing, in a text input box, the text input by the user with a representation of the alternative technique for performing a combination of inputting the text and initiating the selected functional action.

2. The method as described in claim 1, wherein the configuring includes altering a display of at least one said action in the menu to be different than a display of another said action in the menu.

3. The method as described in claim 2, wherein the display of the at least one said action is selected from a display characteristic which is selected from a group consisting of:
highlighting;
bolding;
underlining;
italicizing;
color;
translucence; and
motion.

4. The method as described in claim 1, wherein at least one said action is selected from a group consisting of:
search internet;
read news;
define words;
reference;
shop;
translate; and
calculate.

5. The method as described in claim 1, wherein at least one said action is to be performed at a server via a web site.

6. The method as described in claim 1, wherein:
the text is input by the user at a client;
at least one said action is to be performed by a server that is communicatively coupled to the client via a network; and
another said action is to be performed by the client.

7. The method as described in claim 1, further comprising automatically displaying the configured menu while receiving additional text input by the user, the menu automatically reconfiguring as the additional text is received from the user, the reconfiguring based on the substantive meaning of the additional text as it is received from the user.

8. A client comprising at least one of a memory, a processor, or a display, the client configured with instructions to perform the method as described in claim 1.

9. One or more computer readable media comprising computer executable instructions that, when executed on a computer, direct the computer to perform the method as described in claim 1.

10. One or more computer readable media comprising computer executable instructions that, when executed on a computer, direct the computer to automatically scale a text input box based on an amount of display space taken to display text entered in the text input box, wherein the computer executable instructions are executable to perform acts comprising:
monitor text input by a user in the text input box;
determine content of the inputted text, the content being a substantive meaning of the text; and
configure a menu to display functional actions based on the content of the text, the functional actions to be performed using the text, including selecting which of a plurality of said functional actions is to be included in the menu based on the content of the text and determining an order of display of the functional actions within the menu based on the content of the text, heuristic rules, and a probabilistic determination of a likelihood that the user will select the functional actions included in the menu;
receive a selection by the user of a functional action from the menu;
determine an alternative technique that may be utilized by the user to perform a combination of inputting the text and initiating the selected functional action;
display to the user the alternative technique prior to initiation of the selected functional action, wherein the displaying comprises automatically replacing, in the text input box, the text input by the user with a representation of the alternative technique for performing the functional action prior to initiation of the functional action; and
initiate the selected functional action, including performing the selected functional action on the inputted text.

11. One or more computer readable media as described in claim 10, wherein:
the text input box is provided in a user interface;
the user interface is provided to perform actions using the text input in the text input box; and
the actions are displayed via the user interface in a menu.

12. One or more computer readable media as described in claim 11, wherein at least one said action is selected from a group consisting of:
search internet;
read news;
define words;
reference;
shop;
translate; and
calculate.

13. One or more computer readable media as described in claim 10, wherein the computer executable instructions are executable to:
receive text input by a user via the text input box; and
automatically display a menu representing a plurality of functional actions that are performable using the text while receiving additional text from the user.

14. A computing device having at least one of a memory, a processor, or a display, the computing device comprising the one or more computer readable media as described in claim 10.

15. A method comprising:
receiving text input by a user via a user interface;
determining content of the inputted text, the content being a substantive meaning of the text;
automatically displaying a menu representing a plurality of functional actions, based on the content of the text, that are performable using the text while receiving additional text from the user,
wherein the displaying includes selecting which of the plurality of functional actions is to be included in the menu based on the content of the text and determining an order of display of the functional actions within the menu based on the content of the text, heuristic rules, and a probabilistic determination of a likelihood that the user will select the functional actions included in the menu;
altering the displaying of the menu such that at least one functional action in the menu is displayed with a different display characteristic than another functional action in the menu, the different display characteristic comprising at least one of translucence or motion;
determining an alternative technique that may be utilized by the user to perform a combination of inputting the text and initiating a functional action selected from the menu, wherein the alternative technique does not require use of a cursor control device; and
displaying to the user the alternative technique.

16. The method as described in claim 15, wherein the configuring includes altering a display of at least one said action in the menu to be different than a display of another said action in the menu.

17. The method as described in claim 15, wherein at least one said action is selected from a group consisting of:
search internet;
read news;
define words;
reference;
shop;
translate; and
calculate.

18. The method as described in claim 15, wherein at least one said action is to be performed at a server via a web site.

19. The method as described in claim 15, wherein:
the text is input by the user at a client;
at least one said action is to be performed by a server that is communicatively coupled to the client via a network; and
another said action is to be performed by the client.

20. One or more computer readable media comprising computer executable instructions that, when executed on a computer, direct the computer to perform the method as described in claim 15.

21. A method comprising:
examining inputted text received from a user;
determining content of the inputted text, the content being a substantive meaning of the text;
examining a selection by the user of a functional action from a menu, the functional action to be performed on the inputted text, wherein the menu is configured to display functional actions based on the content of the text, including selecting which of a plurality of said functional actions is to be included in the menu and determining an order of display of the functional actions within the menu based on heuristic rules and a probabilistic determination of a likelihood that the user will select the functional actions included in the menu;
initiating the selected functional action, including performing the selected functional action on the inputted text;
determining an alternative technique that may be utilized by the user to perform a combination of inputting the text and initiating the selected functional action;
displaying to the user a result of performing the selected functional action on the inputted text; and
displaying to the user the alternative technique that may be utilized to input the text and initiate the selected functional action, wherein the displaying comprises automatically replacing, in a text input box, the inputted text with a representation of the alternative technique prior to initiating the selected functional action.

22. The method as described in claim 21, wherein the alternate technique specifies how to perform the selected functional action without using the menu.

23. The method as described in claim 21, wherein at least one said action is to be performed at a server via a web site.

24. The method as described in claim 21, wherein:
the inputted text and the selection of the functional action from the menu are received from the user at a client;
at least one said action is to be performed by a server that is communicatively coupled to the client via a network; and
another said action is to be performed by the client.

25. The method as described in claim 21, wherein the alternative technique is displayed automatically upon initiation of the action.

26. One or more computer readable media comprising computer executable instructions that, when executed on a computer, direct the computer to perform the method as described in claim 21.

27. A system comprising:
a network;
a client communicatively coupled to the network and having one or more modules that are executable to:
receive text input by a user;
determine content of the inputted text, the content being a substantive meaning of the text;
perform a first functional action based on the content of the text;
configure a menu to include representations of the first functional action and a second functional action based on the content of the text,
wherein configure a menu includes selecting the first and second functional actions to be included in the menu from a plurality of functional actions and determining an order of display of the first and second functional actions within the menu based on heuristic rules and a probabilistic determination of a likelihood that the user will select the first and second functional actions included in the menu;
display the configured menu while the user enters additional text; and
teach the user about alternative techniques by dynamically reconfiguring the menu during user interaction, including:
determining an alternative technique that may be utilized by the user to perform a combination of inputting the text and performing the first functional action, and displaying to the user the alternative technique that may be utilized to input the text and perform the first functional action, wherein the displaying comprises automatically replacing, in a text input box, the text input by the user with a representation of the alternative technique prior to initiation of the first functional action; and
a server communicatively coupled to the network and having at least one module that is executable to perform the second functional action.

28. The system as described in claim 27, wherein the menu is configured by ordering the first and second functional actions in the menu based on the text.

29. The system as described in claim 27, wherein the menu is configured by altering a display of the first functional action in the menu to be different than a display of the second functional action in the menu.

30. The system as described in claim 27, wherein at least one of the first or second functional actions is selected from a group consisting of:
search internet;
read news;
define words;
reference;
shop;
translate; and
calculate.

31. The system as described in claim 27, wherein the second functional action is to be performed via a web site that is output through execution of the one or more modules on the server.

32. The system as described in claim 27, wherein the client is configured as
a device that is selected from a group consisting of:
a computer;
a game console;
a wireless telephone; and
a broadcast-enabled computer.

* * * * *